United States Patent [19]
Wood et al.

[11] Patent Number: 5,129,625
[45] Date of Patent: Jul. 14, 1992

[54] LIVE LOAD PACKING SYSTEM

[75] Inventors: Charles W. Wood; William E. Wears, both of Marshalltown, Iowa

[73] Assignee: Fisher Controls International, Inc., Clayton, Mo.

[21] Appl. No.: 594,843

[22] Filed: Oct. 9, 1990

[51] Int. Cl.⁵ .................. F16K 41/04; F16K 37/00
[52] U.S. Cl. ........................ 251/214; 277/2; 277/59; 277/72 FM; 277/106; 277/124; 277/205; 137/553
[58] Field of Search .............. 251/214; 277/2, 105, 277/106, 124, 188 A, 188 R, 205, 123, 59, 72 FM; 137/551, 553

[56] References Cited

U.S. PATENT DOCUMENTS

| | | | |
|---|---|---|---|
| 3,968,970 | 7/1976 | Vogeli | 277/106 |
| 4,283,062 | 8/1981 | Catanzaro et al. | 277/124 |
| 4,352,499 | 10/1982 | Foster | 277/124 |
| 4,475,712 | 10/1984 | DeJager | 251/214 |
| 4,538,790 | 9/1985 | Williams et al. | 251/214 |
| 4,773,442 | 9/1988 | Lephilibert | 251/214 |
| 4,878,677 | 11/1989 | Larkins et al. | 277/123 |

FOREIGN PATENT DOCUMENTS 504799 8/1930 Fed. Rep. of Germany ...... 277/106

Primary Examiner—George L. Walton
Attorney, Agent, or Firm—Marshall, O'Toole, Gerstein, Murray & Bicknell

[57] ABSTRACT

An improved live load packing system for sealing an operating valve member in a fluid valve. A packing follower includes a base and a guide sleeve with a non-metallic inner liner adapted for slidable engagement on the operating valve member. A series of Belleville disk springs slidably engage the guide sleeve outer diameter and maintain concentric mounting during loading of V-type TFE packing members to ensure uniform concentric spring loading and to prevent undesired side loading. A window permits viewing the position of the guide sleeve and inner liner during packing loading adjustment so that optimum loading can be attained and maintained when the viewer notes the top edge of the guide sleeve and inner liner is flush with the top surface of the packing flange.

4 Claims, 2 Drawing Sheets

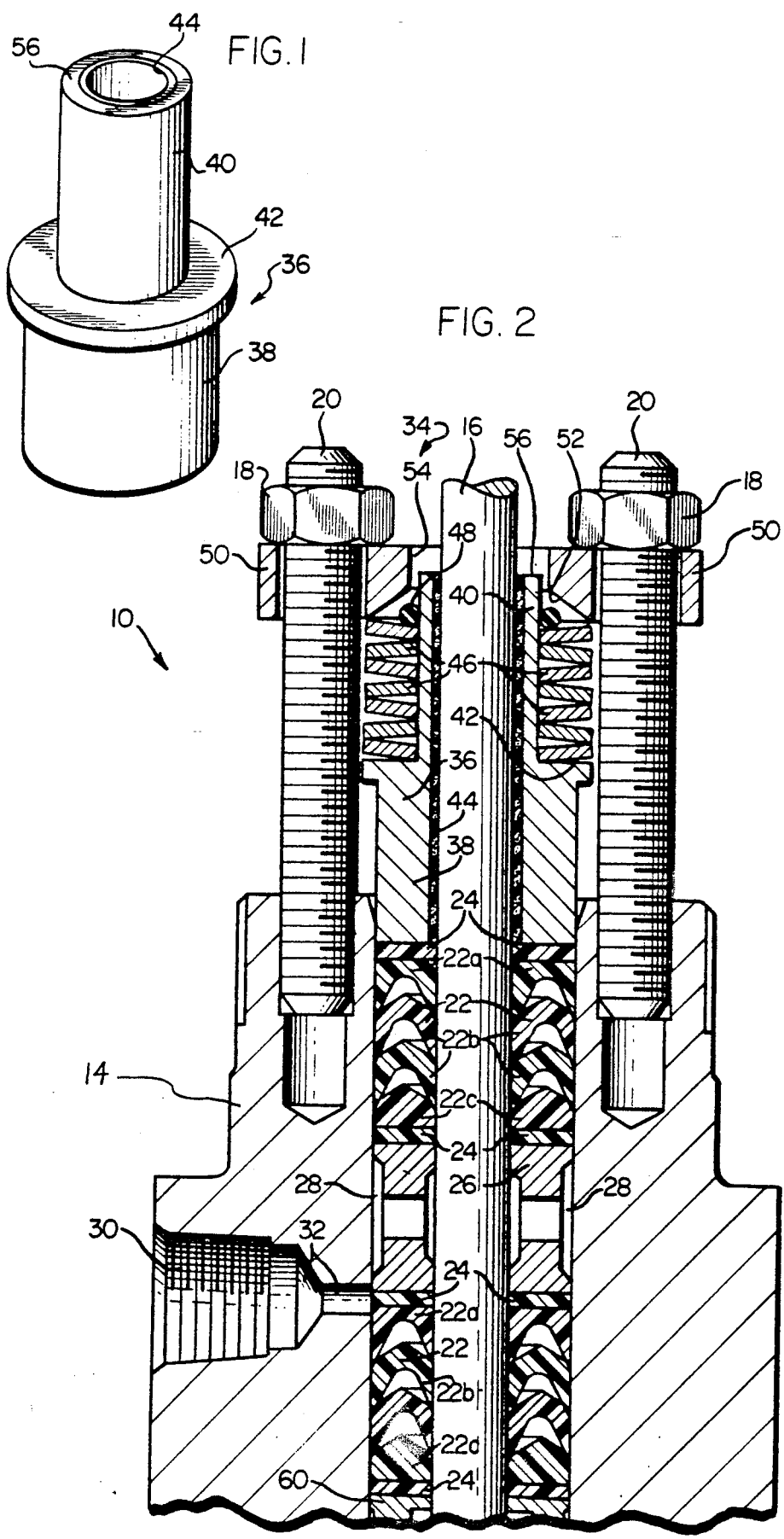

LIVE LOAD PACKING SYSTEM

This invention relates to valve structures used in controlling the flow of fluids, and in particular to an improved live load packing system particularly useful where the fluid is toxic or lethal.

BACKGROUND OF THE INVENTION

It is desired to prevent or to reduce as much as possible leakage of fluid through a valve inserted in the fluid pipeline system. This is particularly desired where the service fluid is either toxic or lethal and in many other applications where it is desired to increase the time periods between maintenance shutdowns to correct any leakage problems occurring in the system.

Fluid valves presently in use for instance use one or more packing rings axially mounted around the fluid valve stem and in frictional engagement therewith. Positive loading means have been attempted to apply a positive load on the packing members to keep the valve stem centered in the packing in an attempt to prevent the leakage of fluid along the valve stem.

For instance, packing ring members formed of tetrafluorethylene (TFE) material are in common use. TFE has a temperature coefficient of expansion which is about 10 times that of metal. In a normal operation of a fluid valve and within its normal intended environment, the packing material tends to expand and contract due to temperature cycling and due to the valve movements. Coil springs are currently in use to apply a positive or live load to the packing material. In some packing configurations, Belleville spring washers are placed around each packing stud in an attempt to apply uniform concentric loading of the Bellevilles onto the packing members, usually through a packing follower. A uniform loading is difficult to achieve in this configuration because it depends upon an equal tightening of the packing studs around the valve stem.

Another attempt to apply a uniform load to the valve stem packing has been to use a coil spring concentrically mounted around the valve stem to apply a load to the packing member. Typically, the inner diameter of the coil spring is purposely made larger than the valve stem diameter to prevent the coil spring from hanging up on the valve stem during its operation. However this spacial separation between the coil spring and the valve stem can permit the spring to apply undesired side loading on the packing members and thereby causing movement of the packing ring members away from the valve stem thereby leading to the leakage of fluid through the valve. Such leakage is of course highly undesired where the service fluid is either toxic or lethal and therefore this leads to maintenance shutdowns in order to remedy the problem. Undesired side loading in such coil spring configurations also may be caused by the unevenness of the formed ends of the coil spring causing uneven loading contact with the packing.

Accordingly, it is desired to provide an improved live load packing system which can apply a uniform load to the valve stem packing and maintain such a uniform packing load during valve stroking and thermal service temperature cycling. It is also desired to provide a compact live load packing system to reduce the physical valve size. It is also desired to provide a live load packing system in which there is presented a visual indication when the packing member compression is optimum. This assures that a uniform load to the valve stem packing has been achieved.

SUMMARY OF THE INVENTION

In accordance with the principles of the present invention, there is provided an improved live load packing system for fluid valves which include packing members surrounding and sealing a valve stem and a packing follower is mounted on the valve stem in loading contact with the packing members. A valve guide sleeve is slidably mounted on the valve stem and includes an inner diameter in sliding contact with the valve stem. In the preferred embodiment of the invention, a Belleville spring member is slidably mounted on the guide sleeve. The guide sleeve outer diameter is slightly smaller than the Belleville spring inner diameter so that the Belleville may slidably operate on the guide sleeve. A packing flange is in contact with one end of the Belleville springs so that adjusting the packing nuts on the packing studs compresses the Belleville disk springs and thereby places a load on the packing ring members.

The guide sleeve acts as a bushing on the valve stem to absorb any side loads from the Belleville members. Therefore, the Bellevilles apply a uniform spring load to the valve stem packing which keeps the valve stem centered within the packing member and thereby prevents any fluid leakage. The present invention also enables dimensional changes in the packing box and packing to occur during a thermal cycle while continuing to maintain a uniform concentric spring load on the valve stem packing. Increased packing member life and less maintenance of the valve compliments is achieved through the use of the present invention.

In a preferred embodiment of the present invention, the packing follower includes a unitary member having a follower base at one end adjacent packing ring members, and an elongated follower guide sleeve at the other end. Belleville disk springs are slidably mounted on the follower guide sleeve until they contact the follower base and the assembly is capped by a packing flange with an enlarged opening surrounding the valve stem. It is preferred that the packing follower include a liner formed of TFE or of carbon filled TFE which is bonded to the packing follower. The liner acts as a bushing on the valve stem to absorb any side loads from the valve actuator or Belleville springs so as to keep the stem centered and to prevent fluid leakage.

Adjusting the packing nuts on the packing studs around the valve stem moves the packing flange against the Belleville springs to compress them and exert a loading force against the packing follower base which in turn loads the packing ring members in a live loaded packing configuration around the valve stem.

It is desired that the Belleville springs be loaded until they are compressed about 85% of full compression to achieve optimal loading of the packing members. When the desired 85% compression amount is achieved for optimum loading, the top of the follower guide sleeve will have protruded into the enlarged area of the packing flange surrounding the valve stem such that the top of the guide sleeve is flush with the top of the packing flange. Therefore, there has been provided in accordance with another aspect of this invention a visual indication to the valve operator of a condition when optimum or proper spring pack compression and therefore proper loading of the valve packing has been achieved.

Using the present invention, not only is proper loading attained but it is also assured that the valve stem will be in a tight seal condition during the service life of the valve. The reliable seal achieved with the present invention is particularly useful in fluid valves used in conditions where fugitive fluid emissions are important because the service fluid is either toxic or lethal. However, it is to be recognized that the present invention is also useful in conventional operating conditions where increased time periods between maintenance shutdowns are desired.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

FIG. 1 is a perspective view of a packing follower in accordance with the present invention;

FIG. 2 is a sectional view of a fluid valve incorporating a live load packing system according to the present invention before loading of the Belleville disk springs.

DETAILED DESCRIPTION

Figure 3:
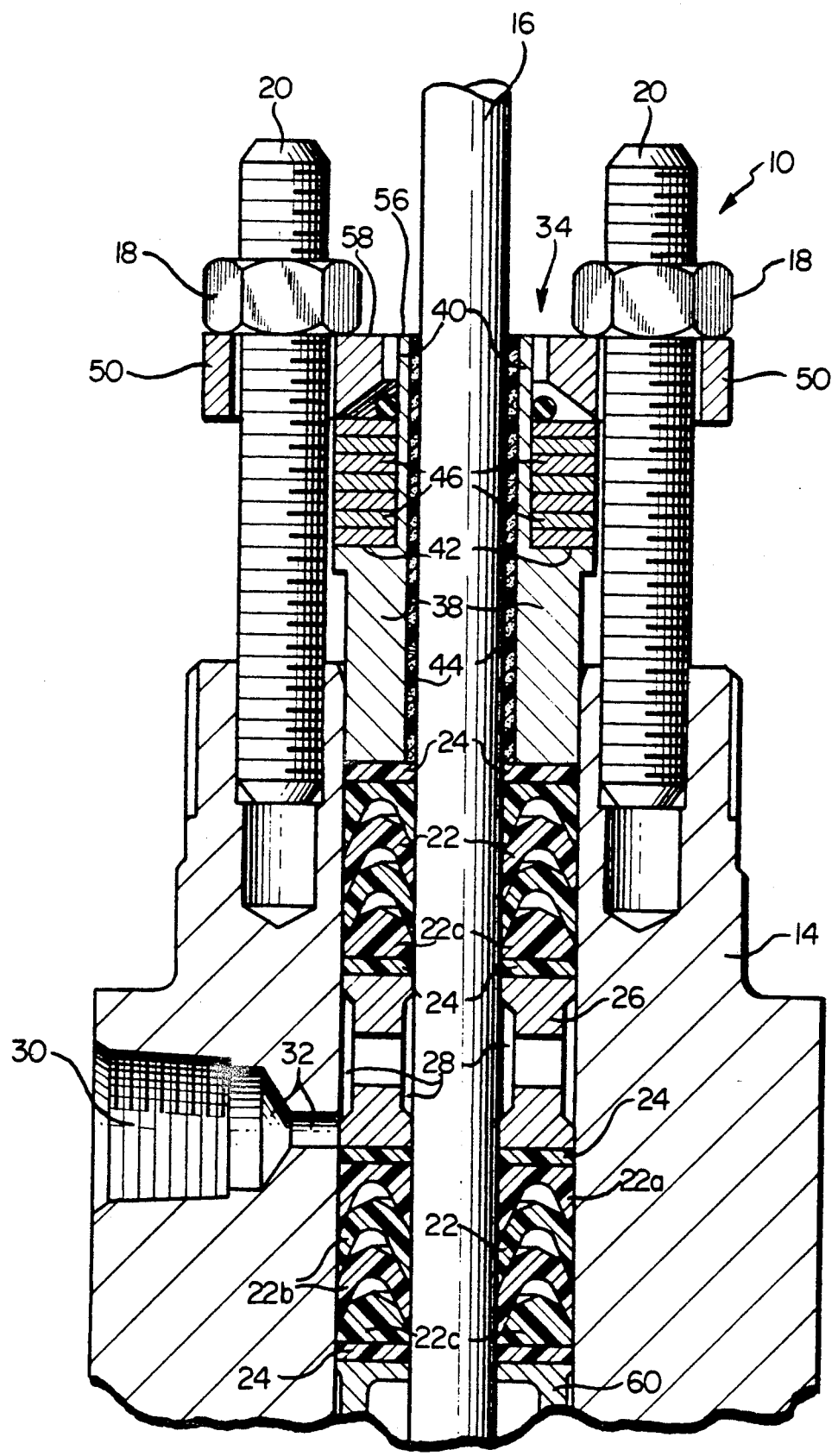
FIG. 3 is a cross sectional view of the valve structure of FIG. 2 with the disk springs being loaded to an 85% compression value.

Referring now to FIGS. 1 and 2, there is illustrated a fluid valve 10 having a valve body with a valve bonnet 14 through which extends a valve stem 16. Packing nuts 18 are threadably mounted on packing studs 20 so as to adjust the loading on the packing within the bonnet and around the valve stem.

Referring to FIG. 2, there is illustrated a preferred embodiment of a double packing configuration. A packing 22 surrounds valve stem 16 and is formed of a series of rings of the type commonly referred to as V-type packing. As shown in FIG. 2, there is an upper and lower packing set. Each set contains four V-rings including a top female adapter ring 22a; two identical middle rings 22b; and a bottom male adapter ring 22c. V-type packing 22 is formed of TFE (tetrafluorethylene—a synthetic resin polymer) and therefore packing 22 is known in the trade as a "V-type TFE packing". Packing suitably formed of other material, or of other synthetic resin polymers, may be utilized.

Two anti-extrusion wiper rings 24 are located at each end of packing 22. Each wiper ring is formed of a composition material, preferably one of high temperature organic and/or inorganic fibers with a nitrile elastomeric binder such that the hardness rating is about 90±5 Shore "B" Durometer. Preferably the material should contain no asbestos or cellulose fiber. Reference may be made for instance to the anti-extrusion wiper rings described in U.S. Pat. No. 4,886,241, assigned to the present assignee.

A lantern ring 26 is place around the valve stem and between the two packing sets. As in the convention use of lantern rings and valves, lantern ring 26 further is adapted in packing bore 28 to enable communication from the valve exterior via access hole 30 and connecting channels 32. This permits lubricating fluid to be inserted into the packing bore and adjacent valve stem 16 and also to permit testing for any leakage around the valve stem or to vent such leakage to a safe location. Reference may be made for instance to FIG. 3 in which there is clearly illustrated the communication of access hole 30 with packing bore 28 after proper loading of the valve packing system has occurred as will be described in more particular hereinafter.

FIG. 2 illustrates the components of the valve 10 including a live load packing system 34 prior to tightening of packing nuts 18 on studs 20 to achieve the optimum live loading configuration which is illustrated in FIG. 3. The preferred embodiment of a live load packing system 34 as illustrated in the drawings include a packing follower 36 having a follower base 38 at one end, a follower guide sleeve 40 at the other end, and a follower flange 42 therebetween. Follower 36 includes a liner 44 formed of carbon filled TFE which may be bonded to the inside surface of the packing follower.

A series of Belleville disk springs 46 is slidably mounted on follower guide sleeve 40 with one end of the disk springs in contact with flange 42 and the other end being maintained in position on guide sleeve 40 by means of an 0-ring 48. A packing flange 50 has suitable apertures through which the packing studs may be passed. The inner diameter of packing flange 50 includes a contact section 52 and a central aperture 54.

Packing flange contact portion 52 lies in contact with one end of the Belleville disk springs 46. Central aperture 54 has a diameter larger than the outer diameter of follower guide sleeve 40 to permit one end of the guide sleeve to pass into the interior of packing flange 50 and be easily viewed from the top of valve 10 as shown in FIG. 3. This aids in the attaining of the desired optimum live loading of the valve packing for the valve as will be described hereinafter.

After assembly of the valve components as shown in FIG. 2, the packing nuts 18 on studs 20 surrounding valve stem 16 are tightened so that packing flange 50 transmits the packing stud and nut load to the Belleville disk springs 46. The Belleville springs 46 in turn become compressed with continued tightening of the nuts 18 so as to maintain a load on packing rings 22 through packing follower 36. It has been determined that optimum loading of live load packing system 34 in accordance with the present invention occurs when the Belleville springs 46, starting from the uncompressed state shown in FIG. 2, are about 85% compressed as shown in the conditions of FIG. 3. The valve operator is assured of achieving the optimum loading by visually inspecting the top of valve 10 and continuing to adjust packing nuts 18 until the top edge 56 of packing follower 36 is flush with the top surface 58 of packing flange 50.

Therefore in accordance with an important aspect of the present invention, a visual indication of proper spring pack compression is provided. A packing box ring 60 is mounted below the second set of packing members 22 and at the end of packing bore 28.

Packing follower 36 with lining 44 along with follower guide sleeve 40 act as a bushing on stem 16 so as to absorb any side loads from the valve actuator or Belleville disk springs and thereby keep the valve stem 16 centered within packing members 22. Furthermore, since the inner diameter of the Belleville disk springs is substantially the same as the outer diameter of guide sleeve 40 so that the Belleville springs slide on the guide sleeve outer surface, there is a direct linear pressure exerted against flange 42 of the packing follower so that the packing follower maintains a linear movement and a linear packing load on packing material 22. The packing material therefore is subjected to a uniform concentric spring load thereby maintaining a uniform packing stress so as to effect a tight valve stem or shaft seal through pressure cycles and thermal cycles.

Rather than a packing follower having unitary base, flange and guide sleeve portions, a separate guide sleeve could be provided having the configuration of guide sleeve 40 but being separate from the packing follower. In that situation, packing follower 36 would include a base 38 and flange 42, and guide sleeve 40 would be formed of a separate member but with the same dimensions to accommodate slidable mounting of Belleville sleeves 46 thereon. Also, other forms of a concentric spring member could be used. Alternatively, a coil spring with an inner ring can be used instead of Belleville disk springs 36 with a suitably sized guide sleeve on which the coil spring and inner ring may be mounted. The inner ring diameter attached to the coil spring should closely match the outer diameter of the guide sleeve so that side loads from the coil spring can be absorbed by the guide sleeve and packing follower and the valve stem can be maintained in a centered condition in accordance with the principles of the present invention.

The foregoing detailed description has been given for clearness of understanding only, and no unnecessary limitations should be understood therefrom, as modifications will be obvious to those skilled in the art.

What is claimed is:

1. In a fluid valve having an elongated operating valve member, packing mounted around said elongated operating valve member for sealing said operating valve member, and loading means for loading and urging said packing sealingly against said operating valve member to inhibit fluid leakage around said operating valve member, the improvement comprising:

side load prevention means mounted between said packing and said loading means for enabling uniform concentric loading of said loading means on said packing sealingly around and against said elongated operating valve member and preventing side loading of said loading means on said packing tending to move said packing away from said elongated operating valve member;

said side load prevention means including sleeve means in slidable mounting contact with said elongated operating valve member including a guide sleeve and a non-metallic inner liner mounted within said guide sleeve for slidable engagement with said elongated operating valve member to absorb any of said side loading;

said loading means including spring means mounted on said guide sleeve for maintaining a uniform concentric spring load on said packing;

adjustment means for adjusting the amount of loading on said packing by slidably adjusting the position of said guide sleeve and inner liner on said operating valve member, said adjustment means including, a packing flange surrounding said guide sleeve and inner liner and engageably contacting said loading means, and a plurality of packing studs and nuts mounting said packing flange to said valve so that adjusting said packing nuts urges said packing flange against said loading means to adjust said packing loading and wherein said guide sleeve and inner liner are not exposed exteriorly beyond said packing flange; and visual indicating means for indicating the adjusted position of said guide sleeve and inner liner so that it may be noted when an optimum amount of loading is reached during said packing load adjustment, said visual indicating means including a central opening in said packing flange sufficient to enable the position of said guide sleeve and inner liner to be viewed during said packing load adjustment and to enable one to determine that said optimum amount of loading has been reached and maintained when the top of said guide sleeve and inner liner is flush with the top of said packing flange.

2. The improvement of claim 1, wherein said non-metallic inner liner is formed of carbon filled TFE.

3. A live load packing assembly for sealing on operating valve member in a fluid valve comprising:

resilient packing members adapted for surrounding said operating valve member at one end thereof;

a packing follower adapted for slidably mounting on said operating valve member adjacent said resilient packing member;

loading means including spring means adapted for mounting on said operating valve member adjacent said packing follower for exerting a uniform spring load on said resilient packing members;

a guide sleeve adapted for slidable mounting on said operating valve member concentrically within said spring means and adjacent said packing follower;

said spring means including Belleville disk springs having an inner opening portion in slidable contact with said guide sleeve to maintain concentric positioning of said Belleville disk springs on said resilient packing members;

said guide sleeve and said packing follower including side load prevention means for enabling uniform concentric loading of said loading means on said packing sealingly around and against said elongated operating valve member and preventing side loading of said loading means on said packing tending to move said packing away from said elongated operating valve member, including an inner liner bonded within said packing follower and said guide sleeve for slidable engagement with said operating valve member and to absorb any of said side loading;

adjustment means for adjusting the amount of loading on said packing by slidably adjusting the position of said guide sleeve and inner liner on said operating valve member, said adjustment means including, a packing flange surrounding said guide sleeve and inner liner and engageably contacting said loading means, and a plurality of packing guide studs and nuts mounting said packing flange to said valve so that adjusting said packing nuts urges said packing flange against said loading means to adjust said packing loading and wherein said guide sleeve and inner liner are not exposed exteriorly beyond said packing flange; and visual indicating means for indicating the adjusted position of said guide sleeve and inner liner so that it may be noted when an optimum amount of loading is reached during said packing load adjustment, said visual indicating means including a central opening in said packing flange sufficient to enable the position of said guide sleeve and inner liner to be viewed during said packing load adjustment and to enable one to determine that said optimum amount of loading has been reached and maintained when the top of said guide sleeve and inner liner is flush with the top of said packing flange.

4. A live load packing assembly for sealing an operating valve member in a fluid valve comprising:

resilient packing members adapted for surrounding said operating valve member at one end thereof;

a packing follower adapted for slidable engagement on said operating valve member adjacent said resilient packing members, said packing follower including a follower base at one end adjacent said resilient packing members, and a follower guide sleeve at the other end having an outer surface concentric with said operating valve member;

loading means including a series of Belleville disk springs with central openings slidably mounted on said follower guide sleeve, said Belleville disk springs central openings adapted for slidable engagement with said follower guide sleeve outer surface for concentric mounting thereon and to maintain said concentric mounting during loading of said resilient packing members to ensure uniform concentric spring loading and to prevent undesired side loading, said packing follower including an inner liner mounted within said packing follower for slidably contacting said operating valve member to absorb any of said side loading;

adjustment means for adjusting the amount of loading on said packing by slidably adjusting the position of said guide sleeve and inner liner on said operating valve member, said adjustment means including, a packing flange surrounding said guide sleeve and inner liner and engageably contacting said loading means, and a plurality of packing studs and nuts mounting said packing flange to said valve so that adjusting said packing nuts urges said packing flange against said loading means to adjust said packing loading and wherein said guide sleeve and inner liner are not exposed exteriorly beyond said packing flange; and visual indicating means for indicating the adjusted position of said guide sleeve and inner liner so that it may be noted when an optimum amount of loading is reached during said packing load adjustment, said visual indicating means including a central opening in said packing flange sufficient to enable the position off said guide sleeve and inner liner to be viewed during said packing load adjustment and to enable one to determine that said optimum amount of loading has been reached and maintained when the top of said guide sleeve and inner liner is flush with the top of said packing flange.

* * * * *

UNITED STATES PATENT AND TRADEMARK OFFICE
CERTIFICATE OF CORRECTION

PATENT NO. : 5,129,625            Page 1 of 2
DATED      : July 14, 1992
INVENTOR(S) : CHARLES W. WOOD, ET AL.

It is certified that error appears in the above-indentified patent and that said Letters Patent is hereby corrected as shown below:

On the title page, Item [56]: References Cited:
   Add the following:

U.S. PATENT DOCUMENTS

| | | | |
|---|---|---|---|
| 1,560,669 | 11/1925 | Dennedy | |
| 2,765,185 | 10/1956 | Mott | 286/30 |
| 3,259,358 | 7/1966 | Tripoli | 251/214 |
| 4,082,105 | 4/1978 | Allen | 137/72 |
| 4,351,512 | 9/1982 | Siver | 251/214 |
| 4,516,752 | 5/1985 | Babbitt et al. | 251/214 |
| 4,540,012 | 9/1985 | Bridges | 137/72 |
| 4,556,196 | 12/1985 | Nimberger | 251/214 |
| 4,597,560 | 7/1986 | Siver | 251/163 |
| 4,759,530 | 7/1988 | Iff | 251/306 |
| 4,886,241 | 12/1989 | Davis et al. | 251/214 |

OTHER PUBLICATIONS

Conval, Inc., Advertising sheet for "Clampseal", CAT90-1-10000.

UNITED STATES PATENT AND TRADEMARK OFFICE
CERTIFICATE OF CORRECTION

PATENT NO. : 5,129,625
DATED : July 14, 1992
INVENTOR(S) : Charles W. Wood, et al It is certified that error appears in the above-indentified patent and that said Letters Patent is hereby corrected as shown below:

<u>In the Claims:</u>

Col. 6, line 15, change "on" to --an--.

Signed and Sealed this

Twenty-sixth Day of July, 1994

Attest:

BRUCE LEHMAN

Attesting Officer

Commissioner of Patents and Trademarks